(12) United States Patent
Ener et al.

(10) Patent No.: US 7,398,981 B1
(45) Date of Patent: Jul. 15, 2008

(54) AUXILIARY AXLE SYSTEM FOR CONCRETE PUMP TRUCK

(75) Inventors: Evran Y. Ener, St. Paul, MN (US); Thomas M. Anderson, Dellwood, MN (US)

(73) Assignee: Schwing America, Inc., White Bear Lake, MN (US)

( * ) Notice: Subject to any disclaimer, the term of this patent is extended or adjusted under 35 U.S.C. 154(b) by 227 days.

(21) Appl. No.: 10/718,181

(22) Filed: Nov. 20, 2003

(51) Int. Cl.
*B62D 61/12* (2006.01)

(52) U.S. Cl. .................. 280/86.5; 280/81.6; 280/43.17; 280/43.23

(58) Field of Classification Search ................ 280/86.5, 280/81.1, 80.1, 209, 93.51, 43.17, 43.18, 280/43.23, 81.6
See application file for complete search history.

(56) References Cited

U.S. PATENT DOCUMENTS

| | | | | |
|---|---|---|---|---|
| 2,650,106 | A * | 8/1953 | French | 280/93.511 |
| 3,704,896 | A * | 12/1972 | Buelow | 280/81.6 |
| 3,860,256 | A | 1/1975 | Jackson et al. | |
| 3,938,822 | A * | 2/1976 | Guerriero | 280/86.758 |
| 4,079,798 | A * | 3/1978 | Ferris | 180/24.02 |
| 4,082,305 | A * | 4/1978 | Allison et al. | 280/81.1 |
| 4,084,833 | A * | 4/1978 | Mohrbacker et al. | 280/81.6 |
| 4,089,544 | A | 5/1978 | Raidel | |
| 4,134,604 | A | 1/1979 | Jackson | |
| 4,311,396 | A * | 1/1982 | Brandi | 366/51 |
| 4,314,709 | A * | 2/1982 | Silbernagel | 280/81.6 |
| 4,418,713 | A | 12/1983 | Schlecht | |
| 4,492,389 | A * | 1/1985 | Wyatt et al. | 280/86.5 |
| 4,530,515 | A | 7/1985 | Raidel | |
| 4,705,133 | A * | 11/1987 | Christenson et al. | 180/209 |
| 4,762,421 | A * | 8/1988 | Christenson et al. | 366/54 |
| 4,823,896 | A | 4/1989 | Evans et al. | |
| 4,848,783 | A * | 7/1989 | Christenson et al. | 280/405.1 |
| 5,018,593 | A * | 5/1991 | Hermann | 180/24.02 |
| 5,018,755 | A * | 5/1991 | McNeilus et al. | 280/81.1 |
| 5,029,895 | A | 7/1991 | Anderson | |
| 5,058,916 | A | 10/1991 | Hicks | |
| 5,498,021 | A * | 3/1996 | Christenson | 280/86.5 |
| 5,540,454 | A * | 7/1996 | VanDenberg et al. | 280/81.1 |
| 5,597,174 | A * | 1/1997 | Christenson et al. | 280/86.5 |
| 5,823,629 | A * | 10/1998 | Smith et al. | 298/23 R |
| 5,897,123 | A * | 4/1999 | Cherney et al. | 280/86.5 |
| 6,003,885 | A | 12/1999 | Richardson | |
| 6,135,469 | A * | 10/2000 | Hulstein et al. | 280/86.5 |
| 6,155,277 | A * | 12/2000 | Barry | 134/104.4 |
| 6,189,901 | B1 * | 2/2001 | Smith et al. | 280/86.5 |
| 6,247,712 | B1 * | 6/2001 | Smith et al. | 280/86.5 |
| 6,247,713 | B1 * | 6/2001 | Konop | 280/86.5 |
| 6,311,993 | B1 * | 11/2001 | Hulstein et al. | 280/86.5 |
| 6,419,247 | B1 * | 7/2002 | Moran | 280/86.5 |
| 6,478,317 | B2 * | 11/2002 | Konop | 280/86.5 |

\* cited by examiner

*Primary Examiner*—Christopher Bottorff
*Assistant Examiner*—George D. Spisich
(74) *Attorney, Agent, or Firm*—Kinney & Lange, P.A.

(57) ABSTRACT

A concrete pumping truck having a forward end and a rear end with a hopper attached at the rear end of the concrete pumping truck comprises an auxiliary axle system pivotally attached to the rear end of the truck adjacent the hopper, the auxiliary axle system comprising a pair of pivotable wheels movable between a first position in contact with a ground surface and a second position elevated above the ground surface.

17 Claims, 6 Drawing Sheets

AUXILIARY AXLE SYSTEM FOR CONCRETE PUMP TRUCK

BACKGROUND OF THE INVENTION

The present invention pertains to an auxiliary axle system for concrete pumping trucks. Generally, concrete pumping trucks carry a pump that draws concrete out of a reservoir called a hopper and pumps concrete through a valve that feeds a pipeline carried by an expandable boom. Together, these components are capable of continuously moving a large volume of heavy, viscous material, such as concrete, considerable vertical or horizontal distances.

The gross weight of concrete pumping trucks has increased with advances in concrete pumping technology that have enabled concrete to be transported to higher or more distant locations. Due to the increased concrete pumping truck size and gross weight, access to roads with axle weight restrictions can be affected. Therefore, there is a need for concrete pumping trucks with an auxiliary axle system so that the concrete pumping trucks can meet the axle weight restrictions for all roads.

BRIEF SUMMARY OF THE INVENTION

A concrete pumping truck with a forward end, a rear end and a hopper attached at the rear end of the truck comprises an auxiliary axle system pivotally attached to the rear end of the truck adjacent the hopper. The auxiliary axle system comprises a pair of steerable wheels movable between a first position in contact with a ground surface and a second position elevated above the ground surface.

DETAILED DESCRIPTION

Figure 1:
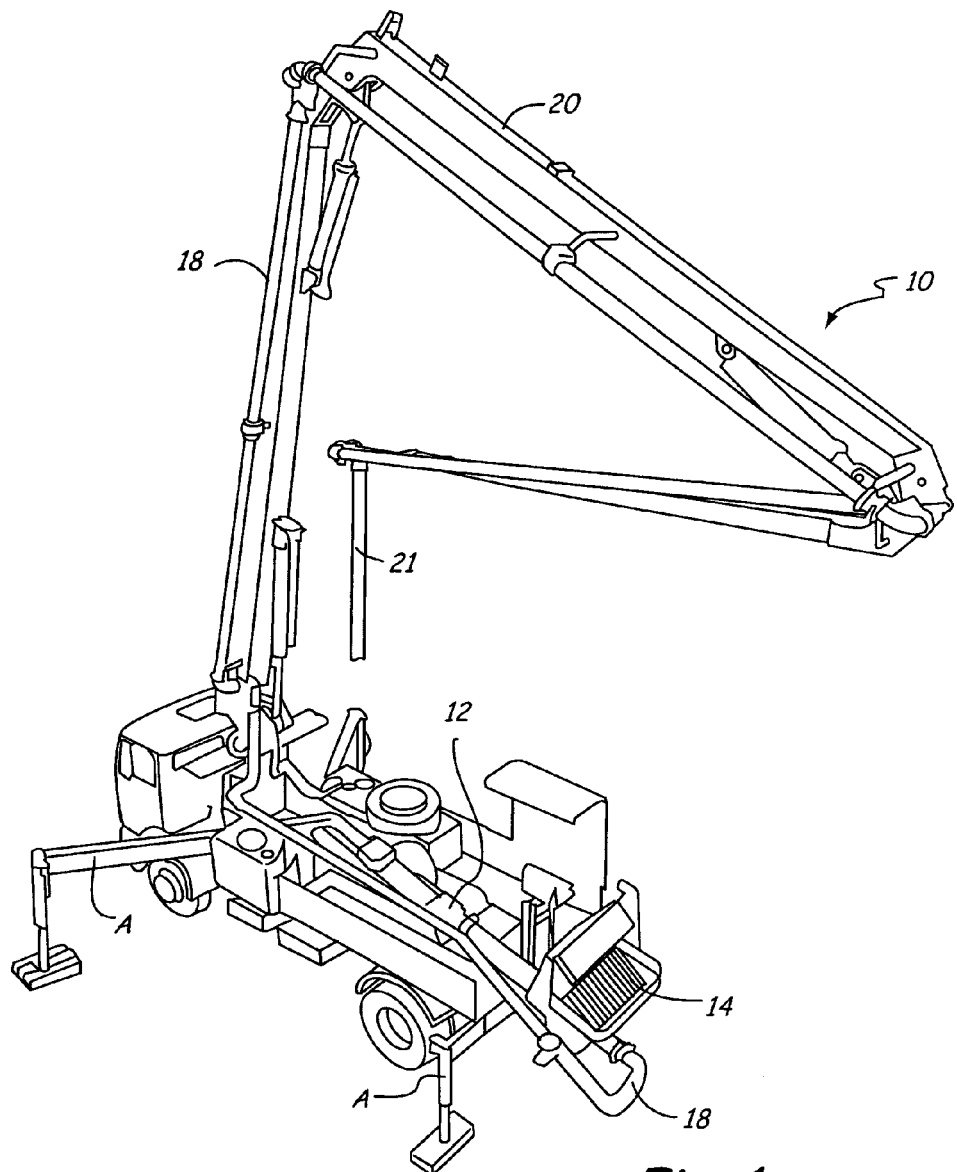
FIG. 1 is a perspective view of a standard concrete pumping truck.

The present invention is an auxiliary axle system that allows a concrete pumping truck access to roads with axle weight restrictions. FIG. 1 shows a perspective view of a typical concrete pumping truck 10. The concrete pumping truck 10 is capable of continuously moving a large volume of heavy, viscous material, such as concrete, considerable vertical or horizontal distances. The truck 10 carries a pump 12 that draws concrete out of a reservoir, or a hopper 14 that is located at the rear of the truck 10. The concrete is pumped through a valve (not shown) at the bottom of the hopper 14 to a pipeline 18 carried by an expandable boom 20, through the pipeline 18 and out an end hose 21. Outriggers A carried by truck 10 provide a stable base to allow boom 20 to extend some distance from the truck 10.

Due to the increased concrete pumping truck size and gross weight, access to roads with axle weight restrictions can be affected, which may inhibit or altogether preclude the concrete pumping truck 10 from reaching a job site. Therefore, there is a need for concrete pumping trucks with an auxiliary axle system so that the concrete pumping trucks 10 can meet the axle weight restrictions for all roads.

Figure 2:
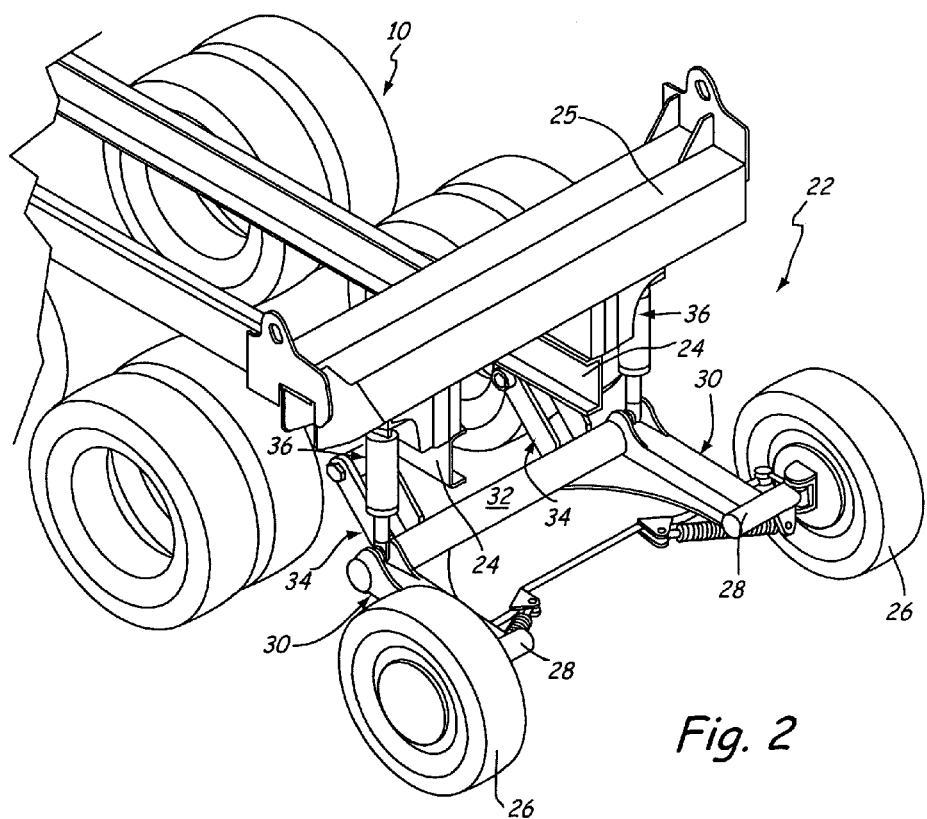
FIG. 2 is a perspective view of an auxiliary axle system attached to a truck frame and an outrigger support frame.

FIG. 2 is a perspective view of an auxiliary axle system 22 attached to truck frame rails 24 and an outrigger support frame 25 at the rear of the truck 10. The outrigger support frame 25, which is supported on and above the truck frame rails 24, carries and stores outriggers A (shown in FIG. 1). The axle system 22 is attached to a rear end of the truck 10 adjacent to the hopper 14, which has been removed from FIG. 2.

The axle system 22 generally comprises a pair of wheels 26 that are pivotally mounted to a pair of spaced short shafts 28, which are secured to and carried by a pair of rearwardly extending support arms 30.

The support arms 30 are linked by a cross support member 32, which further carries two pairs of forward extending attachment arms 34. The attachment arms 34 permit pivotal connection of the axle system 22 to the truck frame rails 24 of the truck 10 at the rear end of the truck 10. Hydraulic cylinders 36 connected at or near the intersection of the cross member 32 and each support arm 30 and connected to the outrigger frame 25 permit the axle system 22 to be raised and lowered according to the axle weight distribution requirements of the truck 10 and for backing up the truck 10.

The spacing of the short shafts 28 and the configuration and location of the cross support member 32 relative to support arms 30 allows the axle system 22 to be mounted and operated proximate to the hopper of truck 10.

Figure 3:
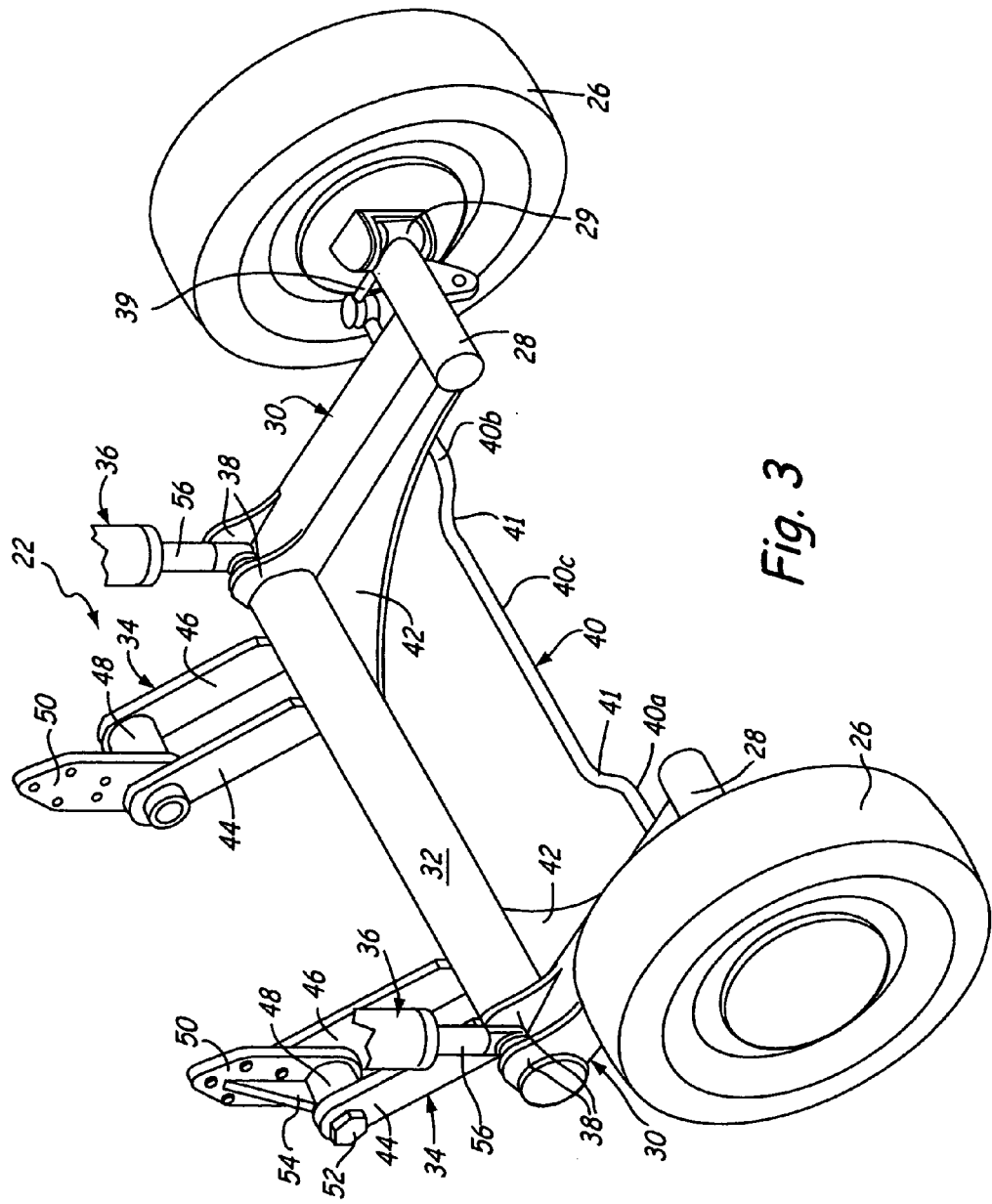
FIG. 3 is a perspective view of the auxiliary axle system shown in FIG. 2.

FIG. 3 is an enlarged perspective view of the auxiliary axle system 22.

As shown in FIG. 3, the pair of wheels 26 each include a standard steering pivot mount 29 (only one is shown) that connects wheels 26 to the end of the short shafts 28 allowing wheels 26 to pivot when the truck 10 turns.

A steering arm 39 is connected to each steering pivot mount 29 of the wheels 26. A tie rod 40 extends between the pair of wheels 26 and is connected to each of the steering arms 39 so that the pair of wheels 26 pivot in unison. As illustrated in FIG. 3, the tie rod 40 is shaped with spaced bends 41 to define two opposing end portions 40a, 40b and a central portion 40c, which permits the tie rod 40 to clear the hopper 14 when the axle system 22 is raised to a stored position.

Each of the short shafts 28 are also connected to one of the support arms 30, such as by welding. The support arms 30 extend transversely from the short shafts 28 in a forward direction relative to the truck 10. Each of the support arms 30 has a pair of mounting flanges 38 at the end opposite the connection to the short shafts 28.

The cross member 32 is connected to the pair of support arms 30 generally adjacent the mounting flanges 38 by welding. The cross member 32 has a length sufficient to space the wheels 26 from the hopper 14 and assist in the alignment of the wheels 26 with the wheels of the truck 10. The cross member 32 and the pair of support arms 30 collectively form a U-shaped frame that allows the axle system 22 to be mounted and operated adjacent the hopper 14 (shown in FIGS. 1 and 3A). The axle system 22 includes a support plate 42 attached, for example by welding, to the cross member 32 and the pair of support arms 30 to provide reinforcement and support to the axle system 22.

The two pair of attachment arms 34 extend forward relative to the truck 10 and are connected to the cross member 32 by welding. Each pair of attachment arms 34 includes a first arm 44 and a second arm 46 that are spaced for connection to the truck frame rails 24. The first arm 44 and the second arm 46 extend at an angle relative to the cross member 32 adequate to connect the axle system 22 to the truck frame rails 24 and allow the axle system 22 to be in a lowered position with the wheels 26 in contact with the ground and to be raised to a stored position relative to the hopper 14. While each pair of attachment arms 34 includes a first arm 44 and a second arm 46 in the preferred embodiment, a single arm may be used for each attachment arm 34.

As shown in FIG. 3, axle system 22 is secured to the truck 10 by a pair of mounting brackets 50. The mounting brackets 50 include a plurality of holes for connecting the mounting brackets 50 to the truck frame rails 24 (as shown in FIGS. 3A-5) by suitable fasteners, such as bolts. Welded to the mounting brackets 50 are bearing housings 48 containing bearings. The attachment arms 34 are secured to each side of the bearing housings 48 by a pivot pin 52 that is inserted through the bearing housings 48. A support 54 welded between the mounting bracket 50 and the bearing housing 48 strengthens the connection of the bearing housings 48 to the mounting brackets 50.

The pair of hydraulic cylinders 36 include a first end 56 connected between the mounting flanges 38 of each support arm 30 by a retaining pin (not shown).

Figure 3A:
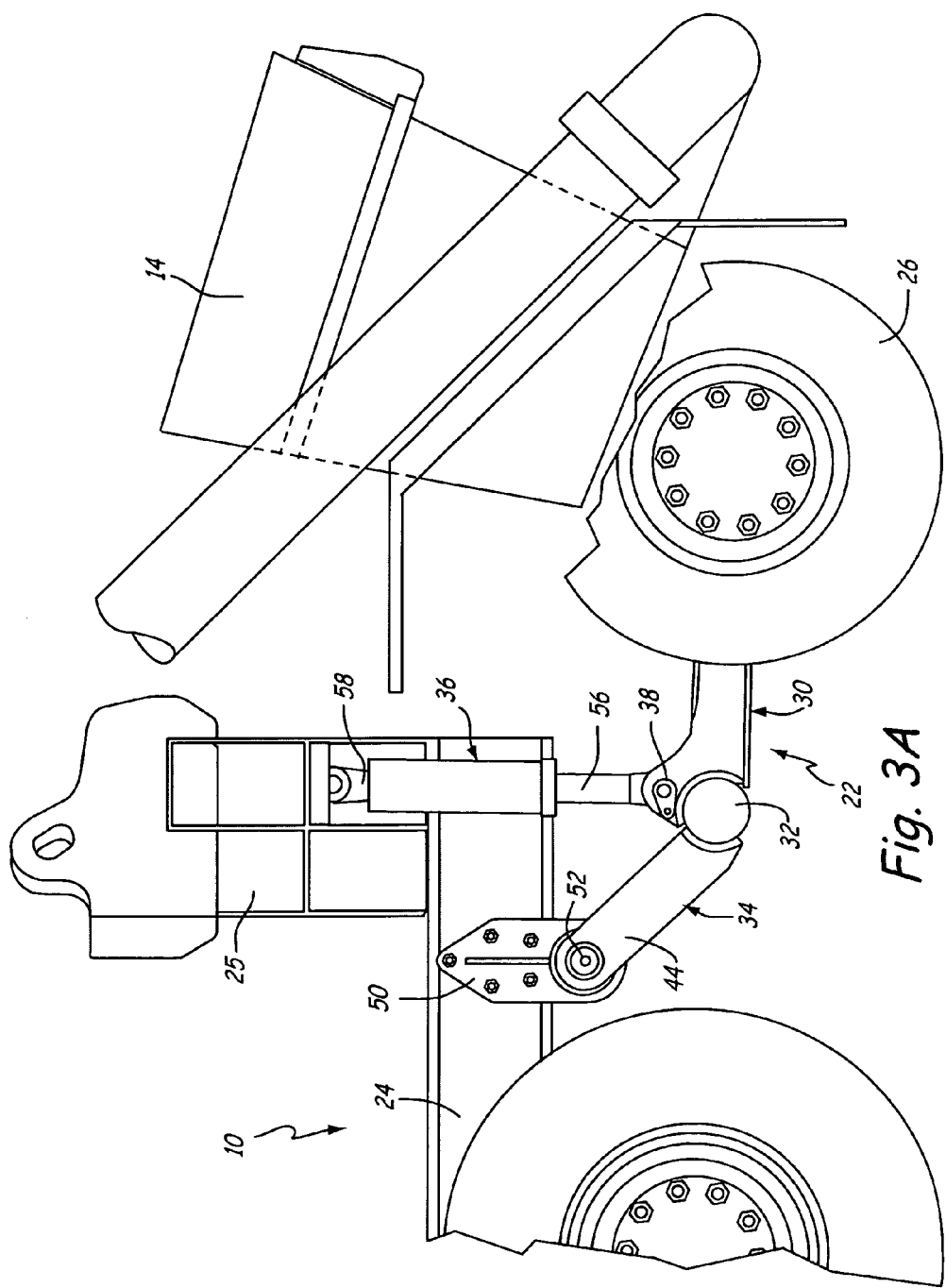
FIG. 3A is a side view of the auxiliary axle system adjacent to a hopper.

As shown in FIG. 3A, the second end 58 of the hydraulic cylinders 36 is connected to the outrigger support frame 25. The pair of hydraulic cylinders 36 are used to raise and lower the axle system 22 from a first position (lowered) to a second position (raised). Although the preferred embodiment includes a pair of hydraulic cylinders 36, a single hydraulic cylinder may also be employed. Further, while hydraulic cylinders 36 are shown connected to the support arms 30, connection may also be made to the cross member 32.

As further shown in FIG. 3A, hopper 14 typically is located relatively close to the ground at the rear of the truck 10. By locating the cross member 32 forward of the hopper 14 and utilizing the pair of spaced short shafts 28, the axle system 22 is able to be stored in a raised position proximate the hopper 14.

As previously discussed, the tie rod 40 is also shaped to accommodate the hopper 14 when the axle system 22 is in the raised and stored position.

Figure 4:
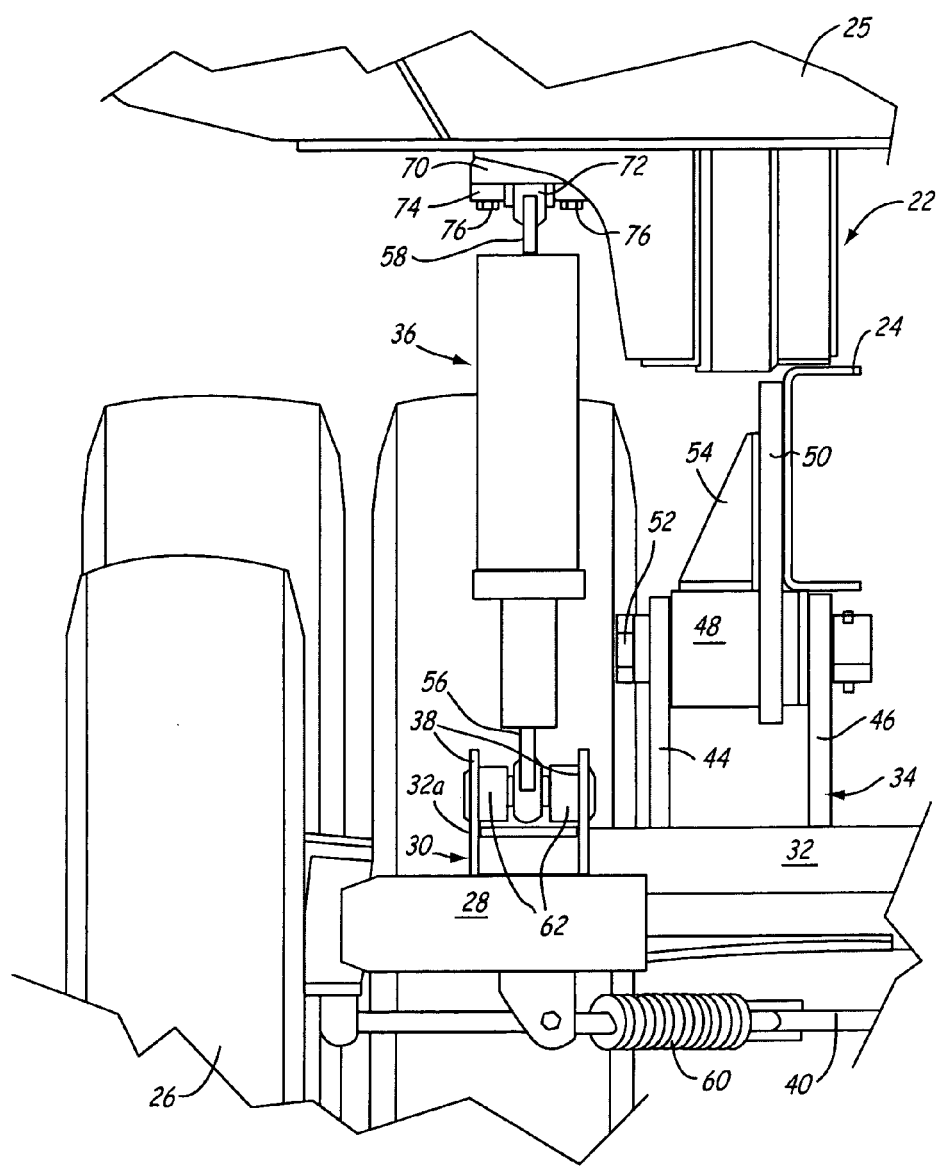
FIG. 4 is an enlarged rear view of one half of the auxiliary axle system.

FIG. 4 is an enlarged rear view of one half of the axle system 22. As shown in FIG. 4, the attachment arms 34 are connected to the truck frame rails 24 through the mounting plate 50. At the opposite end, the attachment arms 34 are welded to the cross member 32 at a location inset from the end 32a of the cross member 32. The support arms 30 are welded at or near the end 32a of the cross member 32.

At the opposite end of the support arms 30, the shafts 28 are secured to the support arms 30. The length of the shafts 28 is selected to ensure that the wheels 26 of the axle system 22 generally align with the wheels of the truck 10.

The first end 56 of the hydraulic cylinder 36 is connected to the pair of mounting flanges 38 of the support arms 30. A pair of spacers 62 are attached between the mounting flanges 38 and the first end 56 of the hydraulic cylinder 36. The spacers 62 center the hydraulic cylinder 36 between the mounting flanges 38.

A second end 58 of the hydraulic cylinder 36 is secured to a support structure of the concrete pumping truck 10, which in one embodiment is the outrigger support frame 25. A plate 70 is mounted to a bottom surface of the outrigger support frame 25, and the second end 58 of the hydraulic cylinder 36 attaches to the plate 70. The second end 58 of the hydraulic cylinder 36 includes a bushing 72 and a bar 74. To connect the second end 58 to the plate 70, the bar 74 is inserted through the bushing 72. The bar 74 is secured to the plate 70 by suitable fasteners, such as bolts 76.

A combination dampener/centering spring 60 is connected between the shafts 28 and the tie rod 40. The combination dampener/centering spring 60 assists the wheels 26 to pivot to a straight position after a turn. The combination dampener/centering spring 60 also prevents the wheels 26 from shimmying when the axle system 22 is in a down and loaded position.

Figure 5:
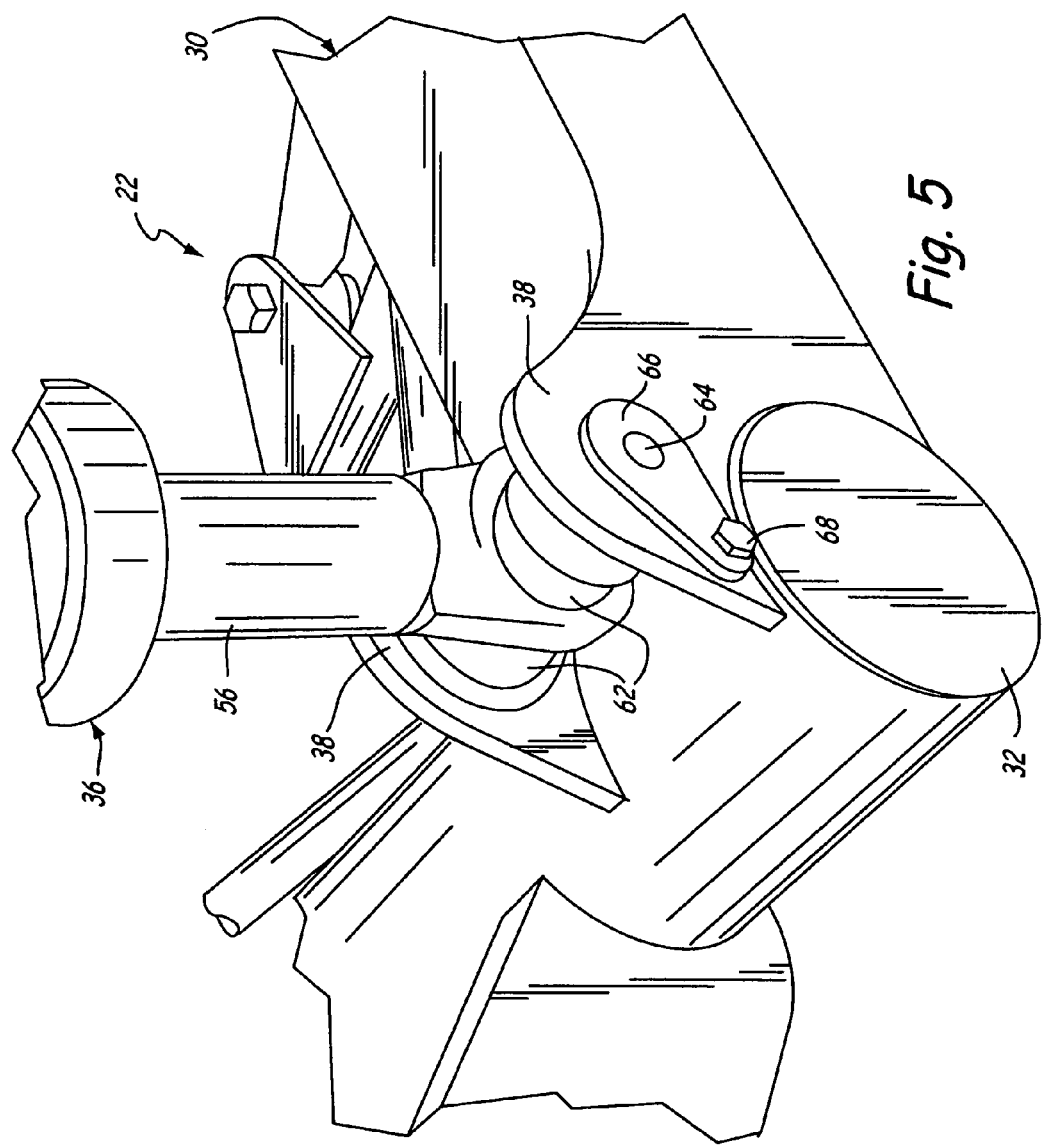
FIG. 5 is an enlarged perspective view of the hydraulic cylinder connection to the rearward connector arm.

FIG. 5 is a further drawing illustrating the connection between the hydraulic cylinder 36 and the support arms 30. The first end 56 of the hydraulic cylinder 36 is connected to the mounting flanges 38. To connect the first end 56 to the mounting flanges 38, a pin 64 with a retainer plate 66 is inserted through a cylindrical hole within the mounting flanges 38 and holes in the spacers 62 aligned with the holes of the mounting flanges 38. A bolt 68 secures the retainer plate 66 to the mounting flanges 38 to secure the pin 64 in place.

The present invention permits an auxiliary axle system 22 to be mounted and operated at a rear end of a concrete pumping vehicle 10 by configuring a U-shaped frame that connects to the truck frame rails 24 and allows the wheels 26 to be positioned adjacent to the hopper 14. The wheels 26 of the auxiliary axle system 22 are steerable with the tie rod 40 configured to avoid the hopper 14 when the auxiliary axle system 22 is in the raised and stored position.

Although the present invention has been described with reference to preferred embodiments, workers skilled in the art will recognize that changes may be made in form and detail without departing from the spirit and scope of the invention. The importance of the present invention is where the components are attached to one another to be able to accommodate the shape of the hopper.

The invention claimed is:

1. A concrete pumping truck having a forward end and a rear end with a hopper carried at the rear end of the concrete pumping truck, the concrete pumping truck comprising an auxiliary axle system pivotally attached to the rear end of the truck adjacent the hopper, the auxiliary axle system comprising a pair of pivotable wheels and a pair of spaced wheel mounts, each wheel mount being pivotally connected to a respective one of the pair of pivotable wheels, the pivotable wheels being movable between a first position in contact with a ground surface and a second position elevated above the ground surface, the first and second positions and any positions in transition between the first and second positions always maintaining the auxiliary axle system to remain forward of a farthest rearward point of the concrete pumping truck hopper carried at the rear end, excluding any point a boom on the concrete pumping truck is able to reach, as well as remain under any obstruction above the auxiliary axle system that is created by the concrete pumping truck.

2. A concrete pumping truck having a forward end and a rear end with a hopper carried at the rear end of the concrete pumping truck, the concrete pumping truck comprising an auxiliary axle system pivotally attached to the rear end of the truck adjacent the hopper, the auxiliary axle system comprising:

a pair of pivotable wheels movable between a first position in contact with a ground surface and a second position elevated above the ground surface;

a U-shaped frame having a pair of rearwardly extending spaced arms connected at forward ends to a cross member, the pair of spaced arms having free rearward ends connected to a pair of spaced wheel mounts, each of the pair of spaced wheel mounts being pivotally connected to a respective one of the pair of pivotable wheels, the rearwardly extending spaced arms defining an open space between the wheel mounts that provides clearance for the wheel mounts and pivotable wheels to be raised into the second position without interference with the hopper such that the respective wheel mounts and wheels are stored on opposite sides of the hopper in the second position such that the first and second positions and any positions in transition between the first and second positions always maintain the auxiliary axle system to remain forward of a farthest rearward point of the hopper carried at the rear end, excluding any point a boom on the concrete pumping truck is able to reach, as well as remain under any obstruction above the auxiliary axle system that is created by the concrete pumping truck;

a first connector arm and a second connector arm connected to the cross member and extending in a direction opposite the direction of the pair of spaced arms, the first and second connector arms pivotally mounted to a respective truck frame rail on the concrete pumping truck; and means connected to a support surface of the concrete pumping truck and the U-shaped frame for moving the auxiliary axle system between the first position and the second position.

3. The concrete pumping truck of claim 2 and further comprising a mounting bracket connected to each of the truck frame rails at the rear end of the concrete pumping truck, each mounting bracket connected to a housing containing a bearing, wherein the first connector arm and the second connector arm are pivotally connected to a respective bearing housing.

4. The concrete pumping truck of claim 2, wherein the means for moving the auxiliary axle system comprises at least one hydraulic cylinder connected between an outrigger support frame and the U-shaped frame.

5. The concrete pumping truck of claim 2 wherein each of the pair of pivotable wheels comprises a steering arm connected to the wheel, the steering arm of each wheel being connected by a tie rod.

6. The concrete pumping truck of claim 5 wherein the tie rod is configured with a central portion and opposing end portions, the central portion of the tie rod being in a first plane and the opposing end portions being in a second plane spaced from the first plane.

7. An auxiliary axle system for a concrete pumping truck having a truck frame and a hopper carried at a rear end of the truck, the axle system comprising:

means connected to the truck frame for supporting a pair of wheels in a spaced relationship from the rear end of the truck adjacent to the hopper, the means including a pair of spaced wheel mounts, each wheel mount being pivotally connected to a respective one of the pair of wheels; and means connected to a support structure of the concrete pumping truck for raising and lowering the auxiliary axle system between an upper storage position and a lower ground-engaging position, wherein the auxiliary axle system always remains forward of a farthest rearward point of the concrete pumping truck hopper carried at the rear end excluding any point a boom is able to reach, as well as remains under any obstruction above the auxiliary axle system that is created by the concrete pumping truck when the auxiliary axle system moves between the two positions or rests at one of the positions.

8. An auxiliary axle system for a concrete pumping truck having a truck frame and a hopper carried at a rear end of the truck, the axle system comprising:

means connected to the truck frame for supporting a pair of wheels in a spaced relationship from the rear end of the truck adjacent to the hopper and always maintaining the auxiliary axle system forward of a farthest rearward point of the concrete pumping truck hopper carried at the rear end, wherein the means for supporting the pair of wheels comprises:

a pair of spaced short wheel mounts, each wheel mount of the pair of wheel mounts being pivotally attached to a respective one of the pair of wheels;

a U-shaped frame having a base at a forward end of the U-shaped frame connected to a pair of rearwardly extending arms, each arm of the pair of arms having a free rearward end connected to a respective one of the pair of wheel mounts, wherein the rearwardly extending spaced arms define an open space between the wheel mounts that provides clearance for the wheel mounts and pivotable wheels to fit around and store on either side of the hopper;

a first connector arm connected between a first frame rail of the truck frame and the base of the U-shaped frame; and a second connector arm connected between a second frame rail of the truck frame and the base of the U-shaped frame, the first connector arm being spaced from the second connector arm; and means connected to a support structure of the concrete pumping truck for raising and lowering the auxiliary axle system.

9. The auxiliary axle system of claim 8, wherein the means for raising and lowering the auxiliary axle system comprises:

at least one hydraulic cylinder connected between the U-shaped frame and a support surface of the concrete pumping truck.

10. The auxiliary axle system of claim 9, wherein each arm of the pair of arms of the U-shaped frame comprise a pair of mounting flanges, a first end of the at least one hydraulic cylinder being connected between the pair of mounting flanges.

11. The auxiliary axle system of claim 9, wherein the support surface of the truck comprises an outrigger support frame connected to the truck frame at the rear end of the concrete pumping truck.

12. The auxiliary axle system of claim 8 and further comprising:

a steering arm connected to each wheel of the pair of wheels; and a tie rod pivotally connected between each steering arm, the tie rod having opposing end portions connected to each steering arm, the opposing end portions being generally aligned with the hopper, the tie rod further having a central portion connected to each of the respective opposing end portions, the central portion configured to be spaced from the hopper.

13. An auxiliary axle system for a concrete pumping truck having a truck frame and an outrigger support frame connected to and elevated from the truck frame at a rear end of the concrete pumping truck adjacent to a hopper, the auxiliary axle system comprising:

a pair of wheels located adjacent to and on either side of the hopper;

a pair of spaced short wheel mounts, wherein each wheel mount of the pair of spaced wheel mounts is pivotally connected to a respective one of the pair of wheels;

a pair of support arms, each support arm having a rearward end and a forward end, the rearward end being connected to a respective one of the pair of spaced short wheel mounts and extending transverse from the pair of spaced short wheel mounts;

a cross member connected to the forward ends of the pair of support arms, the cross member being longitudinally spaced forward from the pair of wheels, the cross member and the pair of support arms defining a U-shaped frame wherein an open space between the rearward ends of the arms of the U-shaped frame is large enough to allow the U-shaped frame to fit around the hopper;

a first set of attachment arms connected between the cross member and a first truck frame rail of the truck frame and a second set of attachment arms connected between the cross member and a second truck frame rail; and a lift mechanism connected between the U-shaped frame and a support surface of the concrete pumping truck, said lift mechanism always maintaining the pair of wheels adjacent to the hopper forward of a farthest rearward point of the concrete pumping truck hopper carried at the rear end.

14. The auxiliary axle system of claim 13, wherein the lift mechanism comprises at least one hydraulic cylinder connected to at least one of the pair of support arms.

15. The auxiliary axle system of claim 13, wherein the lift mechanism comprises a pair of hydraulic cylinders, each hydraulic cylinder of the pair being connected to a respective one of the support arms.

16. The auxiliary axle system of claim 13 and further comprising a tie rod connected between the pair of wheels, the tie rod having opposing end portions and a central portion defined by first and second spaced bends in the tie rod, the central portion configured to be spaced forward from the hopper to allow space for the rearward ends of the U-shaped frame to fit around the hopper when the auxiliary axle system is in a raised position.

17. The auxiliary axle system of claim 13 and further comprising a pair of support plates connected to the cross member, each of the support plates being connected to one of the pair of support arms.

* * * * *